United States Patent Office 3,228,914
Patented Jan. 11, 1966

3,228,914
PREPARATION OF POLYURETHANE
ELASTOMERS
Louis Henri Noel Saint-Frison, Louis Pierre Francois
Andre Neuville, and Jean-Marie Massoubre, all of
Clermont-Ferrand, Puy-de-Dome, France, assignors to
Michelin & Cie, Clermont-Ferrand, Puy-de-Dome,
France
No Drawing. Filed Apr. 5, 1960, Ser. No. 19,997
Claims priority, application France, Apr. 9, 1959, 791,572
6 Claims. (Cl. 260—75)

The present invention relates to novel elastomers of the polyurethane type and a process for their preparation, and more specifically to novel improved elastomers of the polyurethane type which are provided with a plasticity permitting conventional calendering, extrusion and like operations without an adverse effect on final moulding and curing operations, and to a novel process for their production.

It is difficult to obtain perfectly moulded products free from bubbles or blisters using polyurethane gums of low viscosity prepared by conventional methods. The aim of the invention therefore is to obviate this disadvantage and to obtain elastomers having a plasticity suitable for working at moderate temperatures of the order of from 30° C. to 60° C., and which also have excellent moulding properties at the curing stage. A further aim is to obtain elastomers having particular structural properties which influence the vulcanizing reaction and give cross-linked products which are remarkable for their high resilience and their increased breaking strength.

Accordingly, the process for the preparation of a polyurethane in accordance with the invention comprises reacting together in a polymerizing reaction a polymeric dihydroxy compound and a diisocyanate to form a linear polyurethane, and reacting with said polyurethane a bifunctional compound, reactive with isocyanates, to form a branched chain molecule having free —NCO groups. An important feature of the invention is in the use of an excess of diisocyanate sufficient to produce a branched chain elastomer wherein the —NCO groups terminate all of the chains of the branched end product, and wherein the ratio by weight of free —NCO groups to the branched elastomer is in the range of from .3% to .2%, and preferably in the range of from .5% to 1.5%.

The branched chain elastomer even at room temperature, rapidly changes to a cross-linked state, and therefore, it is further in accordance with the invention, to replace all of the free —NCO groups responsible for the change, by terminal hydroxy groups, or other groups capable of blocking a cross-linking reaction.

Subsequently, cross-linking and curing of the elastomer is effected by adding thereto a polyisocyanate and vulcanizing the elastomer under pressure and at an elevated temperature.

It is to be understood that the term "polymeric dihydroxy compound" includes polyesters, polyethers, polyester amides and the like conventionally employed in the preparation of polyurethanes, and hereinafter designated HO—P—OH. Preferably, the polymeric dihydroxy compounds have a molecular weight of the order of 750 to 5000.

Similarly, the "bifunctional compound reactive with isocyanates" is defined, for the purposes of the present specification, as a compound of low molecular weight having two groups capable of reacting with isocyanate groups, and shall include diols, diamines, diacids and the like, hereinafter designated by HO—B—OH.

Finally, the diisocyanates will hereinafter be represented by OCN—D—NCO.

The process according to the invention can be illustrated by the two reactions (I) and (II) given below which correspond to the two theoretical phases in the formation of cross-linked polyurethanes having —NCO terminal groups according to the invention. It will become apparent from the examples, that the reactions (I) and (II) may be carried out either successively or simultaneously, depending on the manner in which the reactants take effect.

By the following reaction of an excess amount of a diisocyanate and a polymeric dihydroxy compound, a linear polyurethane is formed:

(I) $(m+1)$OCN—D—NCO$+m$HO—P—OH$\rightarrow$OCN
—(D—NH—CO—OP—O—CO—NH—D)$_m$—NCO $m$ being between 1 and 10, and preferably between 1 and 4.

For the sake of simplicity, the linear polyurethane obtained in (I) will be denoted OCN—M—NCO.

By the reaction of said linear polyurethane, in excess, with a bifunctional compound reactive with isocyanates, the following branched chain elastomer is obtained:

(II)
$(n+1)$OCN—M—NCO $+ n$HO—B—OH $\longrightarrow$
OCN—M—(NH—CO—O—B—O—CO—NH—M)$_n$—NCO $\longrightarrow$

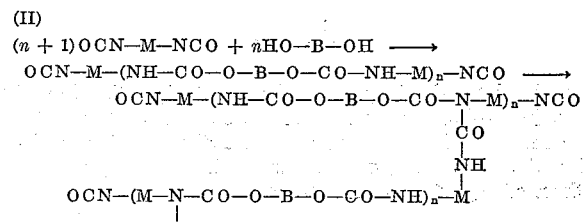

$n$ being between 1 and 10 and preferably between 1 and 4.

The branched elastomer finally obtained having free —NCO terminal groups, for the sake of convenience shall be hereinafter designated

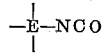

and also has, for the above indicated molecular weight values for HO—P—HO, and for the coefficients $m$ and $n$, a molecular weight of the order of 40,000, while the linear polyurethane OCN—M—NCO obtained in (I) has a molecular weight of the order of from 1,000 to 10,000.

The branching reaction (II) is interrupted when the elastomeric gum reaches a plasticity compatible with a good performance in connection with the usual equipment employed in the rubber industry. However, even at room temperature, the gum rapidly changes to a cross-linked state. In order to stabilize it, it is proposed, in accordance with the invention to replace all the free —NCO groups, responsible for this change, by terminal hydroxy groups.

For this purpose, there is incorporated, by mixing, in the branched elastomer obtained in (II), i.e.

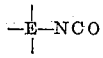

a polyfunctional hydroxy compound having one grouping of higher reactivity than the hydroxy groups contained therein. The amount of the hydroxy compound required corresponds to the number of reactive groups available equivalent to the number of free —NCO groups in

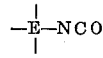

In practice, the reactive groups are generally amino groups, so that the stabilization is effected by means of aminoalcohols, such as aminomonohydroxy and aminodihydroxy, as also aminotrihydroxy alcohols. The amine function may itself be primary or secondary provided there is no more than one aromatic carbon atom attached to the amino nitrogen. As an example of compounds which may be employed, there may be mentioned monoethanolamine, diethanolamine, methylaminoethanol, phenylaminoethanol and 2-amino-2-methyl-propane-1:3-diol.

The stabilizing reaction may be represented by:

(III)

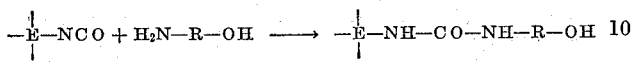

Naturally, the proportion of aminoalcohol, which is molecularly equivalent to the number of free —NCO groupings of

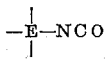

is critical, since a deficiency of aminoalcohol will permit, to a greater or lesser degree, substantially cross-linking of the elastomer, while an excess will result in degradation thereof.

It will be noted that, while the proportion of aminoalcohol necessary for the stabilization of

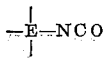

can be determined by a chemical method of titration of the free —NCO groupings in the elastomer, it can also be determined by a simple and more direct method utilizing the properties possessed by aminoalcohols, namely, those of degrading the elastomer

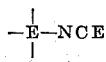

when an excess of aminoalcohol is employed, and of permitting a reduction in plasticity of the elastomer when an insufficient quantity is employed.

The test consists of incorporating, in small specimens of 20 g. and in the presence of a catalyst, for example cobalt naphthenate, known quantities of ethanolamine encompassing theoretical properties approximately calculated from the reaction formulae. After heat treatment at 120° C. for a quarter of an hour, that specimen, the plasticity of which has not varied, indicates the quantity of ethanolamine necessary for correct stabilization of the elastomer. It has been verified that this quantity does not differ from that deduced from titration of the isocyanate groups in the gum.

Finally, by using the reactive groups by which the free —NCO groupings are replaced, for instance, hydroxy groups emanating from the stabilizing aminoalcohol, it is possible, subsequently to vulcanize the stabilized elastomer by incorporating into the elastomer a cross-linking polyisocyanate, preferably an aromatic diisocyanate. The elastomer is cured under pressure at 130–150° C.

This reaction may be represented by:

(IV)

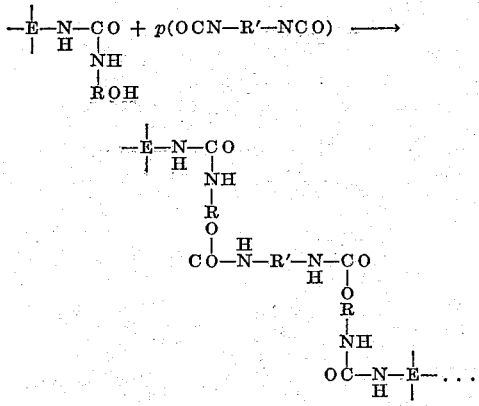

R' is preferably an aromatic nucleus as indicated, and $p$ is defined as that amount necessary to effect the desired curing and cross-linking of the elastomer. The particular value of $p$ can be readily computed or otherwise ascertained.

There is then obtained a vulcanized urethane rubber having excellent properties, notably in regard to breaking strength, resilience and abrasive strength.

If desired, this vulcanization may be further promoted by means of mineral or organic compounds of basic nature (for example magnesia) or metallic derivatives (organometallic salts or compounds of iron or of cobalt) acting as catalysts for the vulcanizing reaction.

The following examples illustrate the invention.

EXAMPLE 1

To 1,000 part by weight of a mixed ethylenepropylene polyadipate (3 part of ethylene to 1 part of propylene) having a hydroxyl number of 85.5 and an acid number of 0.5 and containing 0.1% by weight of water, are added 19.5 parts by weight of butanediol and 5 parts by weight of adipic acid. On addition of 320 parts by weight of 3:3'-dimethyldiphenylene-4:4'-diisocyanate and of 10 parts by weight of magnesia at 90° C., followed by heating in an oven at 120° C. for 3 to 5 hours, there is obtained a urethane gum which can be perfectly worked between 40° and 70° C. on a roll-type mixer, but which still has the disadvantage that it becomes slowly cross-linked at room temperature.

Stabilization is effected by incorporating into the rubber an amount of ethanolamine equivalent to the amount of isocyanate groups existing in the urethane gum and responsible for cross-linking during storage.

Thus, in this example, titration gave 0.6% by weight of terminal —NCO groups present in the unstabilized elastomer. The quantity of ethanolamine therefore necessary is equal to about 0.9% by weight of the elastomer determined by the direct chemical method discussed above.

The stability of the gum thus treated is illustrated in the following Table I by the change of the Mooney viscosity.

*Table I*

| | Initial Mooney Plasticity | At the end of: | | |
|---|---|---|---|---|
| | | 1 Month | 2 Months | 3 Months |
| Stabilized | 20 | 20 | 25 | 25 |
| Unstabilized | 20 | 40 | cross-linked | |

For the purpose of comparison with ethanolamine, stabilization was effected on certain samples by the addition of piperidine added in an amount equal to 1.2% by weight, equivalent to the optimum amount of ethanolamine that would be required. Tests were also conducted using different amounts of ethanolamine and piperidine. The results of these tests are set out in the following Table II, giving the properties of rubbers obtained by cross-linking with diisocyanates from gums stabilized with ethanolamine and with piperidine. It was determined that the use of piperidine resulted in excellent stability for the elastomer, but the results obtained and set out in Table II indicate that piperidine did not produce a rubber, after final cross-linking, having properties equivalent to or as good as rubbers produced by the addition of ethanolamine.

The samples obtained by the addition of ethanolamine and piperidine for Table II were vulcanized with the following agents in the proportions stated based on 100 parts by weight of the stabilized elastomer: 3 parts of magnesia, 8 parts of 3:3'-dimethyldiphenylmethane-4:4'-diisocyanate, and 1 part of cobalt naphthenate.

The use of cobalt naphthenate, a reaction catalyst for isocyanates, was rendered necessary by the fact that it was impossible in the absence thereof to obtain appropriately molded and cross-linked rubbers, using elastomers stabilized with piperidine. On the other hand elastomers stabilized with ethanolamine appear to vulcanize correctly without the aid of the said catalyst.

The curing was effected at 134° C. for 60 minutes under a pressure of 15 kg./cm.$^2$ The percentages of the two stabilizers correspond equimolecularly. The theoretical quantities of ethanolamine and of piperidine necessary for optimum stabilization, as hereinbefore defined, are 0.9% and 1.2% respectively.

| Stabilization | Percent (0) | Modulus (1) | Loss (2) | Breaking (3) | Elongation (4) |
|---|---|---|---|---|---|
| a Ethanolamine | 0.6 | 200 | 15 | 3.4 | 550 |
| b Ethanolamine | 0.7 | 200 | 13 | 3.8 | 520 |
| c Ethanolamine | 0.9 | 190 | 14 | 4.2 | 580 |
| d Ethanolamine | 1.0 | 170 | 17 | 3.5 | 590 |
| a' Piperidine | 0.8 | 140 | 22 | 2.5 | 630 |
| b' Piperidine | 1.0 | 155 | 21 | 2.7 | 610 |
| c' Piperidine | 1.2 | 155 | 25 | 2.6 | 595 |
| d' Piperidine | 1.4 | 120 | 27 | 2 | 725 |

0 Percentage by weight used calculated on the weight of the gum.
1 Modulus of elasticity at 150% in g./mm.$^2$.
2 Hysteresis loss at 20° C.
3 Breaking strength in kg./mm.$^2$.
4 Elongation in percent.

The above verifies that the optimum proportions of ethanolamine, about 0.9%, corresponds to the amount of free —NCO groups present.

It is also apparent that the rubber treated with ethanolamine is superior relative to that treated with piperidine, in regard to the modulus of elasticity, the hysteresis loss, and especially the breaking strength.

A heating measurement carried out by means of a Goodrich flexometer (load 7 kg./cm.$^2$; stroke 6.2 mm.; cycles 1560 per minute; temperature of the test 38° C.) on specimen c (stabilized with 0.9% of ethanolamine) indicated a temperature increase of 26° C. with a permanent deformation of 1.9, which is comparable to the heating and fatigue characteristics of a vulcanized natural rubber measured under the same conditions.

On the other hand, it is to be emphasized that the gums stabilized with piperidine did not give mixtures with which measurements could be made on the flexometer. The test pieces heated and cracked before the end of the test.

EXAMPLES II, III AND IV

The methods for preparing the stabilized elastomers and the tests conducted were identical to those of Example I, except that 0.9% by weight of ethanolamine (e) was replaced by 1.55% by weight of diethanolamine (f), 1.1% by weight of N-methyl-ethanolamine (g) and 2% by weight of N-phenylethanolamine (h).

The vulcanization of these elastomers, including elastomer e, was effected by incorporating in 100 parts of gum, 3 parts of magnesia, 8 parts of 3:3'-dimethyldiphenylmethane-4:4'-diisocyanate and 0.1 part of cobalt naphthenate.

The following table recapitulates the properties of these vulcanized products:

| Elastomer | Modulus (at 150% in g./mm.$^2$) | Hysteresis loss at 20° C. | Breaking in kg./mm.$^2$ | Elongation in percent |
|---|---|---|---|---|
| e | 197.5 | 14.5 | 4.3 | 555 |
| f | 207.6 | 18.7 | 4.3 | 515 |
| g | 180.5 | 17.5 | 2.6 | 545 |
| h | 153.5 | 17 | 3.4 | 660 |

EXAMPLE V 1,000 parts by weight of a mixed ethylenepropylene polyadipate (3 parts of ethylene to 1 part of propylene) having a hydroxyl number of 81.4 and an acid number of 0.7 are reacted for 60 minutes at 90° C. with 320 parts by weight of 3:3'-dimethyldiphenylene-4:4'-diisocyanate in the presence of 0.1 part by weight of ferric chloride and 10 parts by weight of magnesia.

5 parts by weight of adipic acid and 25 parts by weight of butane-1:4-diol are then added. The mixture is well homogenized and is then poured into a tank and heated in an oven at 120° C. for 3 to 5 hours.

The urethane gum thus obtained is stabilized by the addition of 0.9% of ethanolamine.

After incorporation on a roll-type mixer at 50° C. of 90 parts by weight (on the basis of 1,000 parts of the initial polyester) of 3:3'-dimethyldiphenylmethane-4:4'-diisocyanate and 20 parts by weight of magnesia, followed by curing for 60 minutes at 134° C., under a pressure of 15 kg./cm.$^2$, a urethane rubber is obtained, the properties of which are as follows:

Modulus of elasticity at 250% (g./mm.$^2$) _____ 355
Resilience (by rebounding) at 60° C. _____ 90.3
Breaking strength (kg./mm.$^2$) _____ 4.8
Breaking elongation in percent _____ 600

While we have described the invention in detail, it will be understood that it shall be limited in scope only as defined in the claims which follow.

We claim:
1. The process for the preparation of a stabilized branched chain polyurethane elastomer which comprises the steps of
   (1) heating at a temperature of about 90° C. for about 60 minutes $m$ moles of (a) a polymeric dihydroxy compound having a molecular weight between 750 and 5000 selected from the class consisting of polyesters, polyethers and polyester amides with $m + 1$ moles of (b) an organic diisocyanate, $m$ being between 1 and 10, to form (c) a linear polyurethane having terminal isocyanato groups, (2) heating at a temperature of about 120° C. for about 3 to about 5 hours $n + 1$ moles of said (c) linear polyurethane having terminal isocyanato groups with $n$ moles of (d) a bifunctional compound reactive with said isocyanato groups selected from the class consisting of low molecular weight diols, diamines and dicarboxylic acids, $n$ being between 1 and 10, to form sequentially (e) an unstable linear polyurethane having terminal isocyanato groups and containing said bifunctional compound and then (f) an unstable branched chain polyurethane elastomer having at substantially all terminal portions thereof free isocyanato groups, the ratio by weight of free isocyanato groups to the unstable branched chain polyurethane elastomer being in the range of from 0.3% to 2%, and (3) mixing at a temperature from about 40° C. to about 70° C. said (f) unstable branched chain polyurethane elastomer having at substantially all terminal portions thereof free isocyanato groups with (g) an aminoalcohol, the proportion of said aminoalcohol used corresponding to the quantity of the amino groups therein equivalent to the number of free isocyanato groups in the unstable branched chain polyurethane elastomer, to form (h) a stabi- lized branched chain polyurethane elastomer having the branches terminated by hydroxyl groups.

2. The process as set forth in claim 1 wherein steps (1) and (2) are carried out simultaneously by heating a mixture of reactants (a), (b) and (d) at a temperature of about 90° C. for about 60 minutes and thereafter at a temperature of about 120° C. for about 3 to about 5 hours.

3. The process as set forth in claim 1 wherein the aminoalcohol (g) is selected from the class consisting of monoethanolamine, diethanolamine, methylaminoethanol, phenylaminoethanol and 2-amino-2-methylpropane-1:3-diol.

4. The process for the preparation of a stabilized branched chain polyurethane elastomer which comprises the steps of
(1) heating at a temperature of about 90° C. for about 60 minutes $m$ moles of (a) a polymeric dihydroxy compound having a molecular weight between 750 and 5000 selected from the class consisting of polyester, polyethers and polyester amides with $m + 1$ moles of (b) an organic diisocyanate, $m$ being between 1 and 4, to form (c) a linear polyurethane having terminal isocyanato groups, (2) heating at a temperature of about 120° C. for about 3 to about 5 hours $n + 1$ moles of said (c) linear polyurethane having terminal isocyanato groups with $n$ moles of (d) a bifunctional compound reactive with said isocyanato groups selected from the class consisting of low molecular weight diols, diamines and dicarboxylic acids, $n$ being between 1 and 4, to form sequentially (e) an unstable linear polyurethane having terminal isocyanato groups and containing said bifunctional compound and then (f) an unstable branched chain polyurethane elastomer having at substantially all terminal portions thereof free isocyanato groups, the ratio by weight of free isocyanato groups to the unstable branched chain polyurethane elastomer being in the range of from 0.5% to 1.5%, and (3) mixing at a temperature from about 40° C. to about 70° C. said (f) unstable branched chain polyurethane elastomer having at substantially all terminal portions thereof free isocyanato groups with (g) an aminoalcohol, the proportion of said aminoalcohol used corresponding to the quantity of the amino groups therein equivalent to the number of free isocyanato groups in the unstable branched chain polyurethane elastomer, to form (h) a stabilized branched chain polyurethane elastomer having the branches terminated by hydroxyl groups.

5. The process as set forth in claim 1 comprising the additional step 4 of vulcanizing said stabilized branched chain polyurethane elastomer (h) by heating it at a temperature of about 134° C. for about 60 minutes and at a pressure of about 15 kilograms per square centimeter with (i) an organic polyisocyanate to react the organic polyisocyanate with the terminal hydroxyl groups on the stabilized branched chain polyurethane elastomer to form (j) a vulcanized branched chain polyurethane elastomer.

6. The process for the preparation of a stabilized branched chain polyurethane elastomer which comprises mixing at a temperature from about 40° C. to about 70° C. an (f) unstable branched chain polyurethane elastomer having at substantially all terminal portions thereof free isocyanato groups, the ratio by weight of free isocyanato groups to the unstable branched chain polyurethane elastomer being in the range of from 0.3% to 2%, with (g) an aminoalcohol, the proportion of said aminoalcohol used corresponding to the quantity of the amino groups therein equivalent to the number of free isocyanato groups in the unstable branched chain polyurethane elastomer, to form (h) a stabilized branched chain polyurethane elastomer having the branches terminated by hydroxyl groups.

References Cited by the Examiner

UNITED STATES PATENTS

| | | | |
|---|---|---|---|
| 2,621,166 | 12/1952 | Schmidt et al. | 260—858 |
| 2,625,531 | 1/1953 | Seeger | 260—858 |
| 2,871,218 | 1/1959 | Schollenberger | 260—858 |
| 2,907,752 | 10/1959 | Smith | 260—75 |
| 2,912,414 | 11/1959 | Schultheis et al. | 260—75 |
| 2,917,486 | 12/1959 | Nelson et al. | 260—75 |
| 2,983,702 | 5/1961 | Little et al. | 260—858 |
| 2,998,403 | 8/1961 | Muller et al. | 260—858 |
| 3,100,759 | 8/1963 | Boussu et al. | 260—75 |

LEON J. BERCOVITZ, *Primary Examiner.*

D. ARNOLD, WILLIAM H. SHORT, DONALD E. CZAJA, *Examiners.*

UNITED STATES PATENT OFFICE
CERTIFICATE OF CORRECTION

Patent No. 3,228,914 January 11, 1966

Louis Henri Noel Saint-Frison et al.

It is hereby certified that error appears in the above numbered patent requiring correction and that the said Letters Patent should read as corrected below.

Column 3, line 34, for "-NCE" read -- -NCO --; line 42, for "properties" read -- proportions --; column 4, line 16, for "part" read -- parts --.

Signed and sealed this 10th day of January 1967.

(SEAL)
Attest:

ERNEST W. SWIDER
Attesting Officer

EDWARD J. BRENNER
Commissioner of Patents